(12) United States Patent
Tomaru

(10) Patent No.: US 7,545,549 B2
(45) Date of Patent: *Jun. 9, 2009

(54) LIGHT MODULATION DEVICE

(75) Inventor: Yuichi Tomaru, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 400 days.

This patent is subject to a terminal disclaimer.

(21) Appl. No.: 11/450,266

(22) Filed: Jun. 12, 2006

(65) Prior Publication Data

US 2006/0281018 A1    Dec. 14, 2006

(30) Foreign Application Priority Data

Jun. 10, 2005   (JP)   ............... 2005-171059
May 26, 2006   (JP)   ............... 2006-146442

(51) Int. Cl.
  *G02F 1/01* (2006.01)
  *G02F 1/07* (2006.01)
  *G02B 26/00* (2006.01)
(52) U.S. Cl. .................. 359/240; 359/237; 359/260
(58) Field of Classification Search ................ 257/432; 359/237, 240, 260, 321, 322, 332, 578; 385/129
See application file for complete search history.

(56) References Cited

U.S. PATENT DOCUMENTS 7,292,222 B2 *  11/2007  Ahn et al. ............... 345/107
7,365,895 B2 *  4/2008  Tomaru ................... 359/260
7,403,292 B2 *  7/2008  Tomaru ................... 356/517
7,477,442 B2 *  1/2009  Iwamatsu et al. ......... 359/296

FOREIGN PATENT DOCUMENTS

JP    2001-174719 A    6/2001
WO   WO 2002/082042 A2   10/2002

* cited by examiner

*Primary Examiner*—David N Spector
(74) *Attorney, Agent, or Firm*—Sughrue Mion, PLLC

(57) ABSTRACT

A first reflecting body, which has semi-transmissive semi-reflective characteristics, a light transmissive fine hole body having a plurality of fine holes, which are adapted to be filled with a light transmissive substance and have diameters sufficiently smaller than wavelengths of incident light, and a second reflecting body, which has perfect reflective characteristics or semi-transmissive semi-reflective characteristics, are located in this order from a light incidence side. Absorption characteristics for absorbing light having a specific wavelength are exhibited in accordance with a mean complex index of refraction of the first reflecting body, the mean complex index of refraction of the second reflecting body, and the mean complex index of refraction and a thickness of the light transmissive fine hole body. The incident light is modulated due to the absorption characteristics, and modulated light is radiated out from the first reflecting body and/or the second reflecting body.

11 Claims, 4 Drawing Sheets

LIGHT MODULATION DEVICE

BACKGROUND OF THE INVENTION

1. Field of the Invention

This invention relates to a novel light modulation device, which exhibits absorption characteristics for absorbing light having a specific wavelength and is capable of modulating light by the effect of the absorption characteristics.

2. Description of the Related Art

As light modulation devices, which exhibit absorption characteristics for absorbing light having a specific wavelength and are capable of modulating light by the effect of the absorption characteristics, for example, interference filters, such as etalons, have been used in practice. However, conventional interference filters are required to have a high level of smoothness and a high level of a film thickness accuracy. Therefore, the conventional interference filters are not always easy to produce, and costs of the conventional interference filters are not capable of being kept low. Also, the conventional interference filters are not always capable of being formed as filters having a large area. Further, since structures of the conventional interference filters are fixed, the light modulation characteristics of the conventional interference filters are fixed. Therefore, in cases where the wavelength of the light, which is to be absorbed (or transmitted) varies, a different interference filter must be prepared. The conventional interference filters are thus not capable of flexibly coping with alterations in design of optical systems, and the like.

In view of the above circumstances, a light modulation device for performing the light modulation in a state, in which a fluid is filled in a fine hole body having fine holes (nodes) of diameters falling within the range of 1.0 μm to 1.6 μm, has been proposed in, for example, International Patent Publication No. WO2002/082042. The proposed light modulation device has the fine holes having the diameters larger than light wavelengths, exhibits a photonic crystal structure, and modulates the light by the interference effect of the photonic crystal.

Also, a light modulation device for performing the light modulation in a state, in which a fluid is filled in a vessel provided with a pair of light transmissive wall bodies located at a spacing from each other with respect to an optical path direction such that the distance of the spacing is capable of being altered, has been proposed in, for example, Japanese Unexamined Patent Publication No. 2001-174719. With the proposed light modulation device, multiple reflection (resonance) occurs the pair of the light transmissive wall bodies, multiple interference occurs, the light having a specific wavelength is absorbed, and the light is thereby modulated.

With each of the light modulation devices described in, for example, International Patent Publication No. WO2002/082042 and Japanese Unexamined Patent Publication No. 2001-174719, the light modulation characteristics are capable of being altered through alteration of the kind of the fluid filled in the fine hole body or the vessel. However, with each of the light modulation devices described in, for example, International Patent Publication No. WO2002/082042 and Japanese Unexamined Patent Publication No. 2001-174719, it is not always possible to perform high-definition, high-separation light modulation capable of being achieved by the etalons, and the light modulation characteristics appropriate for optical filters are not always capable of being obtained.

SUMMARY OF THE INVENTION

The primary object of the present invention is to provide a novel light modulation device, which is capable of performing high-definition, high-separation light modulation, which enables light modulation characteristics to be altered, which is easy to produce, and which is capable of being formed as a light modulation device having a large area.

The present invention provides a light modulation device, comprising:

i) a first reflecting body, which has semi-transmissive semi-reflective characteristics, ii) a light transmissive fine hole body having a plurality of fine holes, which are adapted to be filled with a light transmissive substance and have diameters sufficiently smaller than wavelengths of incident light, and iii) a second reflecting body, which has perfect reflective characteristics or semi-transmissive semi-reflective characteristics, the first reflecting body, the light transmissive fine hole body, and the second reflecting body being located in this order from a light incidence side, the light modulation device exhibiting absorption characteristics for absorbing light having a specific wavelength in accordance with a mean complex index of refraction of the first reflecting body, the mean complex index of refraction of the second reflecting body, and the mean complex index of refraction and a thickness of the light transmissive fine hole body, whereby the incident light is modulated due to the absorption characteristics, and modulated light is radiated out from the first reflecting body and/or the second reflecting body.

The term "semi-transmissive semi-reflective characteristics" as used herein means that the reflecting body has both the transmissive characteristics and the reflective characteristics. In such cases, the transmittance and the reflectivity may be set arbitrarily. The term "diameters sufficiently smaller than wavelengths of incident light" as used herein means the diameters equal to at most ½ of the shortest wavelength among the wavelengths falling within the wavelength distribution range of the light to be modulated. Also, the term "mean complex index of refraction of a light transmissive fine hole body" as used herein means the mean complex index of refraction obtained from a calculation of the average of the complex index of refraction of the light transmissive fine hole body and the complex index of refraction of a substance contained in the fine holes (i.e., the light transmissive substance in the state, in which the light transmissive substance has been filled in the fine holes, or air in the state, in which the light transmissive substance is not filled in the fine holes).

The light modulation device in accordance with the present invention may be modified such that the mean complex index of refraction of the light transmissive fine hole body is alterable, and the wavelength of the absorbed light is alterable in accordance with the mean complex index of refraction of the light transmissive fine hole body.

The alteration of the mean complex index of refraction of the light transmissive fine hole body embraces both the alteration of the complex index of refraction of the light transmissive substance, which is filled in the fine holes of the light transmissive fine hole body, and the alteration between the empty state, in which the light transmissive substance is not filled in the fine holes of the light transmissive fine hole body, and the filled state, in which the light transmissive substance has been filled in the fine holes of the light transmissive fine hole body.

By way of example, in cases where the kind and/or the quantity of the light transmissive substance filled in the plurality of the fine holes of the light transmissive fine hole body is alterable, the complex index of refraction of the light transmissive substance filled in the plurality of the fine holes of the light transmissive fine hole body is capable of being altered. Therefore, the mean complex index of refraction of the light transmissive fine hole body is capable of being altered through the alteration of the complex index of refraction of the light transmissive substance.

The alteration of the kind of the light transmissive substance embraces the cases wherein constituents of the light transmissive substance are altered, and the cases wherein a concentration of the light transmissive substance is altered, while the constituents of the light transmissive substance are being kept the same.

The light modulation device in accordance with the present invention should preferably be modified such that the plurality of the fine holes of the light transmissive fine hole body are open at a surface of the light transmissive fine hole body on the side of the first reflecting body, the first reflecting body has a plurality of through-holes, each of which communicates with one of the plurality of the fine holes of the light transmissive fine hole body, and the light transmissive substance is capable of being introduced into each of the plurality of the fine holes of the light transmissive fine hole body through each of the plurality of the through-holes of the first reflecting body and is capable of being discharged from each of the plurality of the fine holes of the light transmissive fine hole body through each of the plurality of the through-holes of the first reflecting body.

Also, the light modulation device in accordance with the present invention should preferably be modified such that the plurality of the fine holes of the light transmissive fine hole body are open at a surface of the light transmissive fine hole body on the side of the second reflecting body, the second reflecting body has a plurality of through-holes, each of which communicates with one of the plurality of the fine holes of the light transmissive fine hole body, and the light transmissive substance is capable of being introduced into each of the plurality of the fine holes of the light transmissive fine hole body through each of the plurality of the through-holes of the second reflecting body and is capable of being discharged from each of the plurality of the fine holes of the light transmissive fine hole body through each of the plurality of the through-holes of the second reflecting body.

In such cases, the light modulation device in accordance with the present invention may further be modified such that the plurality of the fine holes of the light transmissive fine hole body are approximately straight holes extending from the side of the first reflecting body toward the side of the second reflecting body.

Further, the light modulation device in accordance with the present invention should preferably be modified such that the light transmissive fine hole body is constituted of a metal oxide body, which is obtained from anodic oxidation processing performed on a part of a metal body to be subjected to the anodic oxidation processing, the second reflecting body is constituted of an un-anodized part of the metal body to be subjected to the anodic oxidation processing, and the first reflecting body is constituted of a metal layer, which has been formed on the light transmissive fine hole body.

Furthermore, the light modulation device in accordance with the present invention should preferably be modified such that the light transmissive fine hole body is constituted of a metal oxide body, which is obtained from anodic oxidation processing performed on an entire region of a metal body to be subjected to the anodic oxidation processing, or a metal oxide body, which is obtained from a processing, wherein the anodic oxidation processing is performed on a part of the metal body to be subjected to the anodic oxidation processing, and wherein an un-anodized part of the metal body to be subjected to the anodic oxidation processing is removed from the metal body to be subjected to the anodic oxidation processing, and each of the first reflecting body and the second reflecting body is constituted of a metal layer, which has been formed on the light transmissive fine hole body.

The light modulation device in accordance with the present invention comprises: (i) the first reflecting body, which has the semi-transmissive semi-reflective characteristics, (ii) the light transmissive fine hole body having the plurality of the fine holes, which are adapted to be filled with the light transmissive substance and have the diameters sufficiently smaller than the wavelengths of the incident light, and (iii) the second reflecting body, which has the perfect reflective characteristics or the semi-transmissive semi-reflective characteristics, the first reflecting body, the light transmissive fine hole body, and the second reflecting body being located in this order from the light incidence side.

With the light modulation device in accordance with the present invention having the constitution described above, the incident light, which has passed through the first reflecting body and has thus entered into the light transmissive fine hole body, iterates reflection between the first reflecting body and the second reflecting body. The multiple reflection thus occurs efficiently, and multiple interference due to the multiple reflected light occurs efficiently. With the constitution described above, the multiple interference conditions vary in accordance with the mean complex index of refraction of the first reflecting body, the mean complex index of refraction of the second reflecting body, and the mean complex index of refraction and the thickness of the light transmissive fine hole body. Therefore, the light modulation device exhibits the absorption characteristics for absorbing the light having the specific wavelength in accordance with the factors, i.e., the mean complex index of refraction of the first reflecting body, the mean complex index of refraction of the second reflecting body, and the mean complex index of refraction and the thickness of the light transmissive fine hole body. The incident light is modulated due to the absorption characteristics, and the modulated light is radiated out from the first reflecting body and/or the second reflecting body.

With the light modulation device in accordance with the present invention, which exhibits the strong absorption characteristics with respect to the specific wavelength due to the multiple interference, high-definition, high-separation light modulation is capable of being performed. Also, the mean complex index of refraction of the light transmissive fine hole body is capable of being easily altered through, for example, the alteration of the complex index of refraction of the light transmissive substance, which is filled in the plurality of the fine holes of the light transmissive fine hole body. Therefore, the light modulation characteristics of the light modulation device in accordance with the present invention is capable of being altered in accordance with, for example, design alterations of an optical system, in which the light modulation device in accordance with the present invention is to be incorporated.

The light modulation device in accordance with the present invention has the structure, which is sufficiently smaller than the wavelengths of the incident light, as the minimum unit of the light modulation. Therefore, the light modulation device in accordance with the present invention exhibits the light modulation characteristics of markedly higher definition and markedly higher separation than the light modulation devices described in, for example, International Patent Publication No. WO2002/082042 and Japanese Unexamined Patent Publication No. 2001-174719. Also, the light modulation device in accordance with the present invention has the structure, in which the light transmissive fine hole body is sandwiched between the two kinds of the reflecting bodies, and the light modulation device is capable of being produced easily by the utilization of the anodic oxidation processing, or the like. Accordingly, the light modulation device in accordance with the present invention has the advantages over the conventional interference filters, such as the etalons, in that the light modulation device in accordance with the present invention is easy to produce and is capable of being formed as a light modulation device having a large area.

DESCRIPTION OF THE PREFERRED EMBODIMENTS

The present invention will hereinbelow be described in further detail with reference to the accompanying drawings.

First Embodiment

Figure 1A:
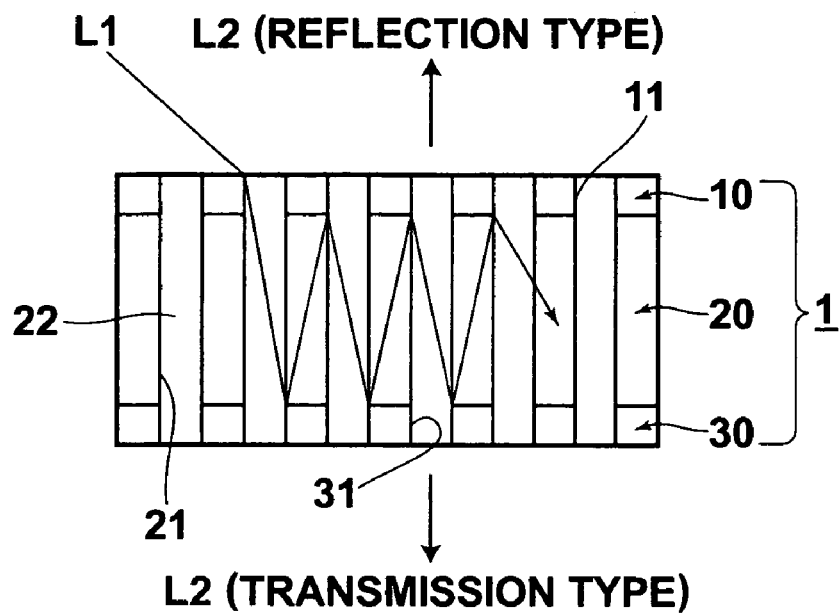
FIG. 1A is a sectional view showing a first embodiment of the light modulation device in accordance with the present invention, the sectional view being taken in a thickness direction of the light modulation device.
Figure 1B:
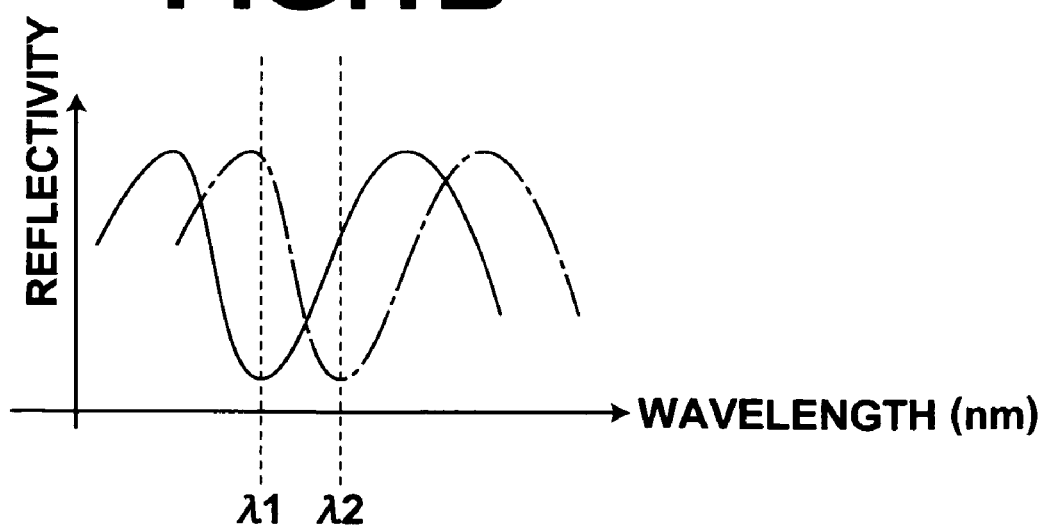
FIG. 1B is a graph showing an example of a variation of a reflected light spectrum.
Figure 2A:
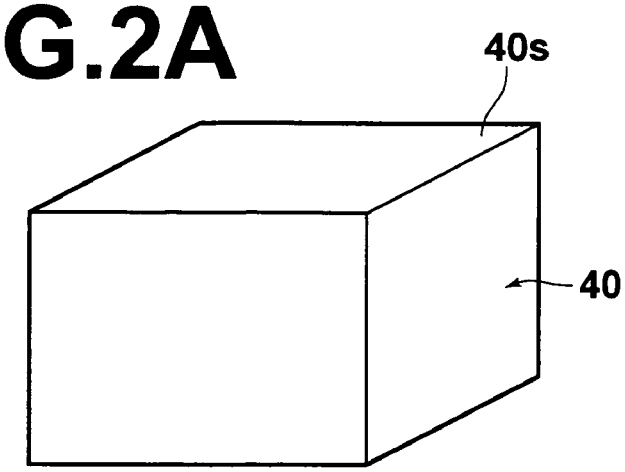
FIGS. 2A, 2B, and 2C are explanatory views showing a process for producing the light modulation device of FIG. 1A.
Figure 2B:
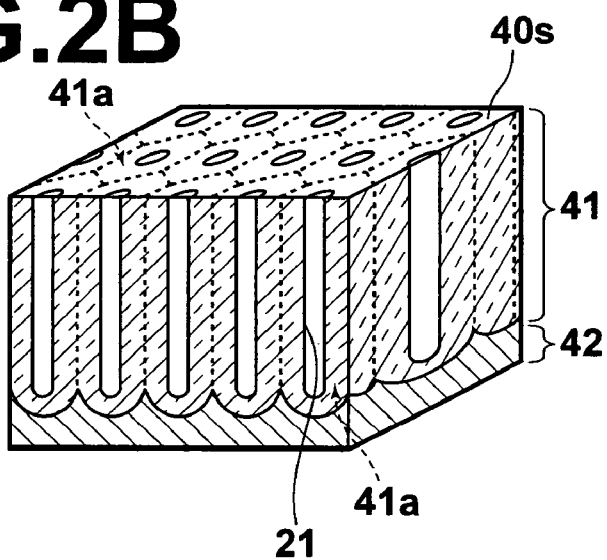
Figure 2C:
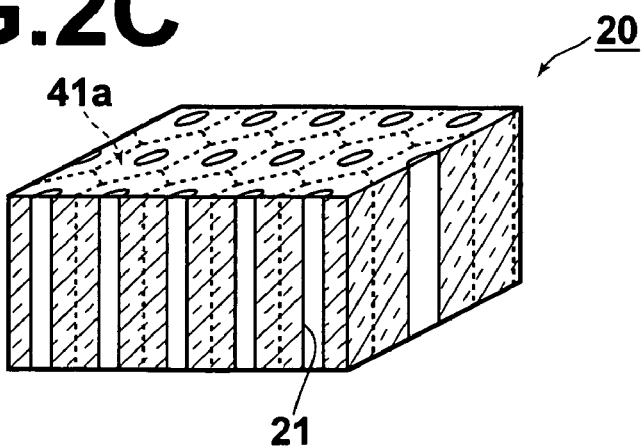

A constitution of a first embodiment of the light modulation device in accordance with the present invention will be described hereinbelow with reference to FIGS. 1A, 1B and FIGS. 2A, 2B, 2C. FIG. 1A is a sectional view showing a first embodiment of the light modulation device in accordance with the present invention, the sectional view being taken in a thickness direction of the light modulation device (with hatching being omitted). FIG. 1B is a graph showing an example of a reflected light spectrum. FIGS. 2A, 2B, and 2C are explanatory views (perspective views) showing a process for producing the light modulation device of FIG. 1A.

With reference to FIG. 1A, a light modulation device 1, which is the first embodiment of the light modulation device in accordance with the present invention, comprises a first reflecting body 10, which has the semi-transmissive semi-reflective characteristics. The light modulation device 1 also comprises a light transmissive fine hole body 20. The light modulation device 1 further comprises a second reflecting body 30, which has the semi-transmissive semi-reflective characteristics. The first reflecting body 10, the light transmissive fine hole body 20, and the second reflecting body 30 are located in this order from a light incidence side (i.e., the top side in FIG. 1A).

Incident light L1 maybe arbitrary light, such as ambient light, e.g. the sunlight or indoor light, or specific light, e.g. broad light or single wavelength light, having been radiated out from a specific light source.

As illustrated in FIG 1A and FIG. 2C, the light transmissive fine hole body 20 is constituted of alumina ($Al_2O_3$, a light transmissive metal oxide). The light transmissive fine hole body 20 has a plurality of fine holes 21, 21, . . . , which are approximately straight holes extending from the side of the first reflecting body 10 toward the side of the second reflecting body 30. Each of the fine holes 21, 21, . . . is a through-hole extending through the light transmissive fine hole body 20 and is open at a surface of the light transmissive fine hole body 20 on the side of the first reflecting body 10 and at a surface of the light transmissive fine hole body 20 on the side of the second reflecting body 30. The fine holes 21, 21, . . . of the light transmissive fine hole body 20 have diameters sufficiently smaller than the wavelengths of the incident light L1 and are arrayed in an approximately regular pattern and at pitches sufficiently smaller than the wavelengths of the incident light L1.

In this embodiment, a light transmissive substance 22 is filled in the plurality of the fine holes 21, 21, . . . No limitation is imposed upon the kind of the light transmissive substance 22. However, from the view point of the capability of being introduced into the fine holes 21, 21, . . . and discharged from the fine holes 21, 21, . . . , the light transmissive substance 22 should preferably be selected from fluidal substances, i.e. liquids and liquid crystals. Examples of the liquids include inorganic solvents, such as water; organic solvents, such as alcohols (methanol, ethanol, and the like) ; mixtures of the inorganic solvents and the organic solvents; and various solutions containing solutes, such as glycerol and cane sugar, dissolved in inorganic solvents and/or organic solvents. Though the capability of being introduced into the fine holes 21, 21, . . . and discharged from the fine holes 21, 21, . . . is comparatively low, the light transmissive substance 22 maybe a solid, such as powder. Also, a gas may be utilized as the light transmissive substance 22.

The light transmissive fine hole body 20 may be produced with a process illustrated in FIGS. 2A, 2B, and 2C. Specifically, as illustrated in FIG. 2A, a metal body 40 to be subjected to the anodic oxidation processing is utilized for the production of the light transmissive fine hole body 20. The metal body 40 to be subjected to the anodic oxidation processing contains aluminum (Al) as a principal constituent and may contain impurities. (The metal body 40 to be subjected to the anodic oxidation processing should preferably have a purity of at least 90%.) The anodic oxidation processing is performed on a part of the metal body 40 to be subjected to the anodic oxidation processing. With the anodic oxidation processing, as illustrated in FIG. 2B, a metal oxide body ($Al_2O_3$) 41 is formed. Thereafter, an un-anodized part 42 of the metal body 40 to be subjected to the anodic oxidation processing, which un-anodized part 42 remains after the anodic oxidation processing has been performed, and a part neighboring with the un-anodized part 42 are removed with etching processing. In this manner, the light transmissive fine hole body 20 as illustrated in FIG. 2C is produced.

The anodic oxidation processing may be performed in the manner described below. Specifically, the metal body 40 to be subjected to the anodic oxidation processing is set as an anode and is immersed together with a cathode in an electrolyte. In this state, a voltage is applied between the anode and the cathode. No limitation is imposed upon the shape of the metal body 40 to be subjected to the anodic oxidation processing. However, the metal body 40 to be subjected to the anodic oxidation processing should preferably have a plate-like shape. Alternatively, the metal body 40 to be subjected to the anodic oxidation processing maybe utilized in a form provided with a support. For example, the metal body 40 to be subjected to the anodic oxidation processing may be formed in a layer shape on a support and may be utilized in this form. The cathode may be constituted of carbon, aluminum, or the like. Also, no limitation is imposed upon the kind of the electrolyte. However, the electrolyte should preferably be an acidic electrolyte containing at least one kind of an acid selected from the group consisting of sulfuric acid, phosphoric acid, chromic acid, oxalic acid, sulfamic acid, benzenesulfonic acid, and amidosulfonic acid.

As illustrated in FIG. 2B, in cases where the anodic oxidation processing is performed on the metal body 40 to be subjected to the anodic oxidation processing, the oxidation reaction advances from a surface 40s of the metal body 40 to be subjected to the anodic oxidation processing toward the direction approximately normal to the surface 40s. The metal oxide body ($Al_2O_3$) 41 is formed in this manner. The metal oxide body 41 having been formed with the anodic oxidation processing has a structure, in which a plurality of fine pillar-shaped bodies 41a, 41a, . . . having approximately regular hexagon shapes, as viewed from above, are arrayed without a spacing being left among them. At an approximately middle area of each of the fine pillar-shaped bodies 41a, 41a, . . . , the fine hole 21 extending approximately straightly in the depth direction from the surface 40s is formed. Also, a bottom surface of each of the fine pillar-shaped bodies 41a, 41a, . . . has a round shape. The structure of the metal oxide body, which is formed with the anodic oxidation processing, is described in, for example, "Preparation of Meso-porous Alumina with Anodic oxidation technique and Application as Functional Materials" by Hideki Masuda, Material Technology, Vol. 15, No. 10, p. 34, 1997.

By way of example, in cases where oxalic acid is utilized as the electrolyte, the conditions for the anodic oxidation processing at the time of the formation of the metal oxide body 41 having the regular array structure should preferably be set such that the electrolyte concentration may be 0.5M, the electrolyte temperature may fall within the range of 14° C. to 16° C., and the applied voltage may fall with in the range of 40V to 40±0.5V. The fine holes 21, 21, . . . having been formed under the conditions described above have hole diameters falling within the range of, for example, 30 nm to 95 nm and are arrayed at pitches of approximately 100 nm.

Alternatively, the light transmissive fine hole body 20 may be produced with a process, in which the anodic oxidation processing is performed on the entire region of the metal body 40 to be subjected to the anodic oxidation processing, such that the un-anodized part 42 does not remain after the anodic oxidation processing has been performed.

Each of the first reflecting body 10 and the second reflecting body 30 is constituted of a metal layer. Each of the first reflecting body 10 and the second reflecting body 30 may be formed with, for example, metal vacuum evaporation processing performed on the light transmissive fine hole body 20. As described above, the light transmissive fine hole body 20 has the plurality of the fine holes 21, 21, . . . , which extends through the light transmissive fine hole body 20. Therefore, as illustrated in FIG. 1A, the metal layer for constituting each of the first reflecting body 10 and the second reflecting body 30 is not formed at each of the opening areas of the fine holes 21, 21, . . . As a result, the first reflecting body 10 has a plurality of through-holes 11, 11, . . . , each of which communicates with the corresponding one of the fine holes 21, 21, . . . of the light transmissive fine hole body 20. Also, the second reflecting body 30 has a plurality of through-holes 31, 31, . . . , each of which communicates with the corresponding one of the fine holes 21, 21, . . . of the light transmissive fine hole body 20. The through-holes 11, 11, . . . and the through-holes 31, 31, . . . are formed in the pattern identical with the pattern of the fine holes 21, 21, . . . of the light transmissive fine hole body 20. Therefore, the through-holes 11, 11, . . . and the through-holes 31, 31, . . . have the diameters sufficiently smaller than the wavelengths of the incident light L1 and are arrayed in the approximately regular pattern and at the pitches sufficiently smaller than the wavelengths of the incident light L1.

The first reflecting body 10 and the second reflecting body 30 may be constituted of an identical material. Alternatively, the first reflecting body 10 and the second reflecting body 30 may be constituted of different materials. The material of the first reflecting body 10 and the material of the second reflecting body 30 may be selected from various metals, which have the reflectivity. Examples of the materials of the first reflecting body 10 and the materials of the second reflecting body 30 include Au, Ag, Cu, Al, and alloys of the above-enumerated metals. Each of the material of the first reflecting body 10 and the material of the second reflecting body 30 may contain at least two kinds of metals. Also, each of the material of the first reflecting body 10 and the material of the second reflecting body 30 may contain arbitrary constituents, which are other than the metals, as impurities.

With this embodiment, the light transmissive substance 22 is capable of being filled into the plurality of the fine holes 21, 21, . . . of the light transmissive fine hole body 20 through the plurality of the through-holes 11, 11, . . . of the first reflecting body 10 and/or the plurality of the through-holes 31, 31, . . . of the second reflecting body 30. The introduction of the light transmissive substance 22 into the plurality of the fine holes 21, 21, . . . of the light transmissive fine hole body 20, the discharging of the light transmissive substance 22 from the plurality of the fine holes 21, 21, . . . of the light transmissive fine hole body 20, and the exchange of the light transmissive substance 22 are thus capable of being performed. Also, the quantity of the light transmissive substance 22 filled in the fine holes 21, 21, . . . of the light transmissive fine hole body 20 is capable of being adjusted. Besides the fine holes 21, 21, . . . of the light transmissive fine hole body 20, the light transmissive substance 22 is also capable of being filled in the through-holes 11, 11, . . . of the first reflecting body 10 and/or the through-holes 31, 31, . . . of the second reflecting body 30. FIG. 1A shows the cases wherein the light transmissive substance 22 is filled in the fine holes 21, 21, . . . of the light transmissive fine hole body 20, the through-holes 11, 11, . . . of the first reflecting body 10, and the through-holes 31, 31, . . . of the second reflecting body 30 and is thus filled to the maximum limit.

As described above, the plurality of the fine holes 21, 21, of the light transmissive fine hole body 20 have the diameters sufficiently smaller than the wavelengths of the incident light L1 and are arrayed at the pitches sufficiently smaller than the wavelengths of the incident light L1. Therefore, the light transmissive fine hole body 20 in the empty state, in which the light transmissive substance 22 has not been filled in the fine holes 21, 21, . . . , acts as a thin film with respect to light due to the so-called electromagnetic mesh shielding effect. Also, the light transmissive fine hole body 20 in the filled state, in which the light transmissive substance 22 has been filled in the fine holes 21, 21, . . . , acts as a thin film with respect to light due to the so-called electromagnetic mesh shielding effect.

Further, as described above, the through-holes 11, 11, . . . of the first reflecting body 10 and the through-holes 31, 31, . . . of the second reflecting body 30 have the diameters sufficiently smaller than the wavelengths of the incident light L1 and are formed at the pitches sufficiently smaller than the wavelengths of the incident light L1. Therefore, the first reflecting body 10 in the empty state, in which the light transmissive substance 22 has not been filled in the through-holes 11, 11, . . . , acts as a thin film with respect to light. Also, the first reflecting body 10 in the filled state, in which the light transmissive substance 22 has been filled in the through-holes 11, 11, . . . , acts as a thin film with respect to light. Further, the second reflecting body 30 in the empty state, in which the light transmissive substance 22 has not been filled in the through-holes 31, 31, . . . , acts as a thin film with respect to light. Furthermore, the second reflecting body 30 in the filled state, in which the light transmissive substance 22 has been filled in the through-holes 31, 31, . . . , acts as a thin film with respect to light.

The first reflecting body 10 is constituted of the reflective metal and is provided with the through-holes 11, 11, . . . Also, the second reflecting body 30 is constituted of the reflective metal and is provided with the through-holes 31, 31, . . . Therefore, each of the first reflecting body 10 and the second reflecting body 30 has the light transmissivity and has the semi-transmissive semi-reflective characteristics. The transmittance and the reflectivity of the first reflecting body 10 is determined by the kind of the material of the first reflecting body 10, the thickness of the first reflecting body 10, and the opening density of the through-holes 11, 11, . . . Also, the transmittance and the reflectivity of the second reflecting body 30 is determined by the kind of the material of the second reflecting body 30, the thickness of the second reflecting body 30, and the opening density of the through-holes 31, 31, . . .

As illustrated in FIG. 1A, in cases where the incident light L1 impinges upon the light modulation device 1, in accordance with the transmittance and the reflectivity of the first reflecting body 10, a part of the incident light L1 is reflected from the surface of the first reflecting body 10 (the reflection being not shown), and a part of the incident light L1 passes through the first reflecting body 10 and enters into the light transmissive fine hole body 20. The light, which has entered into the light transmissive fine hole body 20, iterates the reflection between the first reflecting body 10 and the second reflecting body 30. Specifically, the light modulation device 1 has the resonance structure, in which the multiple reflection occurs between the first reflecting body 10 and the second reflecting body 30.

With the light modulation device 1 having the structure described above, multiple interference due to the multiple reflected light occurs, and the absorption characteristics is exhibited such that the light having the specific wavelength is absorbed selectively. The multiple interference condition varies in accordance with the factors, i.e., the mean complex index of refraction of the first reflecting body 10, the mean complex index of refraction of the second reflecting body 30, and the mean complex index of refraction and the thickness of the light transmissive fine hole body 20. Therefore, light modulation device 1 exhibits the absorption characteristics for absorbing the light having the specific wavelength in accordance with the factors described above.

The mean complex index of refraction of the first reflecting body 10 may be represented by $n_1\text{-}ik_1$. The mean complex index of refraction of the light transmissive fine hole body 20 may be represented by $n_2$. The mean complex index of refraction of the second reflecting body 30 may be represented by $n_3\text{-}ik_3$. Also, the thickness of the light transmissive fine hole body 20 may be represented by d. (In this case, each of $k_1$ and $k_3$ represents the extinction coefficient. Also, each of $-k_1$ and $-k_3$ represents the imaginary part. In this embodiment, the imaginary part of the mean complex index of refraction of the light transmissive fine hole body 20 is equal to 0.)

The inventors have found that, in cases where the incident light L1 impinges upon the light modulation device 1 from the direction, which is approximately normal to the light modulation device 1, a peak wavelength (i.e., an absorption peak wavelength) λ of the light, which is absorbed due to the multiple interference, markedly depends upon the mean complex index of refraction $n_2$ of the light transmissive fine hole body 20 and the thickness d of the light transmissive fine hole body 20, and that the absorption peak wavelength λ of the light, which is absorbed due to the multiple interference, the mean complex index of refraction $n_2$ of the light transmissive fine hole body 20, and the thickness d of the light transmissive fine hole body 20 approximately have the relationships represented by the formulas shown below. Specifically, the inventors have found that the absorption peak wavelength λ of the light, which is absorbed due to the multiple interference, appears in the vicinity of the wavelength, which is represented by the formulas shown below, and that the absorption peak wavelength λ varies in the vicinity of the wavelength, which is represented by the formulas shown below, in accordance with the mean complex index of refraction $n_1\text{-}ik_1$ of the first reflecting body 10, the mean complex index of refraction $n_3\text{-}ik_3$ of the second reflecting body 30, the mean complex index of refraction $n_2$ of the light transmissive fine hole body 20, and the thickness d of the light transmissive fine hole body 20.

$$n_2 d \approx (m+1)/2 \times \lambda$$

$$\lambda \approx (m+1) \times 2 n_2 d$$

where m represents an arbitrary integer (0, ±1, ±2, . . . ).

Particularly, in cases where at least one of the first reflecting body 10, the light transmissive fine hole body 20, and the second reflecting body 30 is constituted of a light absorbing body, in which the imaginary part of a complex dielectric constant is not equal to 0, the absorption peak becomes sharp, and strong absorption is exhibited with respect to the light having the specific wavelength. In this embodiment, the first reflecting body 10 and the second reflecting body 30, which are constituted of the metal layers, act as the light absorbing bodies.

The light modulation device 1 should preferably be set as a device structure, in which light impedance matching has been performed such that the number of times of the multiple reflection (a finesse F) within the light transmissive fine hole body 20 becomes maximum. Ordinarily, the finesse F may be represented by the formula shown below. As a reflectivity R of a reflecting body becomes high, the finesse F is apt to become large, and the absorption peak is apt to become sharp.

$$\text{Finesse } F = \pi R^{1/2}/(1-R)$$

This embodiment of the light modulation device 1 modulates the incident light L1 with the absorption characteristics described above and radiates out modulated light L2. In this embodiment, each of the first reflecting body 10 and the second reflecting body 30 has the semi-transmissive semi-reflective characteristics. Therefore, in accordance with the mean complex index of refraction of the first reflecting body 10, the mean complex index of refraction of the second reflecting body 30, the mean complex index of refraction of the light transmissive fine hole body 20, and the thickness d of the light transmissive fine hole body 20, the light modulation device 1 is capable of being constituted as a reflection type of device, in which the modulated light L2 is radiated out from the first reflecting body 10, a transmission type of device, in which the modulated light L2 is radiated out from the second reflecting body 30, or a semi-transmission semi-reflection type of device, in which the modulated light L2 is radiated out from the first reflecting body 10 and the second reflecting body 30.

With the light modulation device 1, in cases where the mean complex index of refraction $n_2$ of the light transmissive fine hole body 20 is altered, the peak wavelength λ of the light, which is absorbed due to the multiple interference, is capable of being altered, and the light modulation characteristics are capable of being altered. The light modulation device 1 enables the selection of the reflection type of device, the transmission type of device, or the semi-transmission semi-reflection type of device.

No limitation is imposed upon the thickness d of the light transmissive fine hole body 20. For example, in cases where the thickness d of the light transmissive fine hole body 20 is set to be at most 300 nm, the number of the absorption peak wavelength in the wavelength distribution range of visible light is capable of being set to be one.

FIG. 1B is a graph showing an example of a variation of a reflected light spectrum (i.e., the spectrum of the light having been radiated out from the first reflecting body 10), which variation occurs in cases where the mean complex index of refraction $n_2$ of the light transmissive fine hole body 20 is altered. FIG. 1B shows an example, in which the absorption peak wavelength has varied from λ1 to λ2.

In this embodiment, the mean complex index of refraction $n_2$ of the light transmissive fine hole body 20 is capable of being altered with a technique (1), wherein the state of the light transmissive fine hole body 20 is changed over between the empty state, in which the light transmissive substance 22 has not been filled in the fine holes 21, 21, . . . of the light transmissive fine hole body 20, and the filled state, in which the light transmissive substance 22 has been filled in the fine holes 21, 21, . . . of the light transmissive fine hole body 20. Also, the mean complex index of refraction $n_2$ of the light transmissive fine hole body 20 is capable of being altered with a technique(2), wherein the kind and/or the quantity of the light transmissive substance 22 to be filled in the fine holes 21, 21, . . . of the light transmissive fine hole body 20 is altered. The alteration of the kind of the light transmissive substance 22 embraces the cases wherein the constituents of the light transmissive substance 22 are altered, and the cases wherein the concentration of the light transmissive substance 22 is altered, while the constituents of the light transmissive substance 22 are being kept the same. Further, in cases where the light transmissive substance 22 is a liquid crystal, or the like, the mean complex index of refraction $n_2$ of the light transmissive fine hole body 20 is capable of being altered with a technique (3), wherein the complex index of refraction of the light transmissive substance 22 having been filled in the fine holes 21, 21, . . . of the light transmissive fine hole body 20 is altered electrically. Furthermore, the alteration of the mean complex index of refraction $n_2$ of the light transmissive fine hole body 20 may be performed with a combination of the techniques (1), (2), and (3) described above.

This embodiment of the light modulation device 1 is constituted in the manner described above.

This embodiment of the light modulation device 1 comprises: (i) the first reflecting body 10, which has the semi-transmissive semi-reflective characteristics, (ii) the light transmissive fine hole body 20 having the plurality of the fine holes 21, 21, . . . , which are adapted to be filled with the light transmissive substance 22 and have the diameters sufficiently smaller than the wavelengths of the incident light L1, and (iii) the second reflecting body 30, which has the semi-transmissive semi-reflective characteristics, the first reflecting body 10, the light transmissive fine hole body 20, and the second reflecting body 30 being located in this order from the light incidence side.

With the light modulation device 1 having the constitution described above, the incident light L1, which has passed through the first reflecting body 10 and has thus entered into the light transmissive fine hole body 20, iterates the reflection between the first reflecting body 10 and the second reflecting body 30. The multiple reflection thus occurs efficiently, and the multiple interference due to the multiple reflected light occurs efficiently. With the constitution described above, the multiple interference conditions vary in accordance with the mean complex index of refraction of the first reflecting body 10, the mean complex index of refraction of the second reflecting body 30, and the mean complex index of refraction and the thickness of the light transmissive fine hole body 20. Therefore, the light modulation device 1 exhibits the absorption characteristics for absorbing the light having the specific wavelength in accordance with the factors, i.e., the mean complex index of refraction of the first reflecting body 10, the mean complex index of refraction of the second reflecting body 30, and the mean complex index of refraction and the thickness of the light transmissive fine hole body 20. The incident light L1 is modulated due to the absorption characteristics, and the modulated light L2 is radiated out from the first reflecting body 10 and/or the second reflecting body 30. With this embodiment of the light modulation device 1, which exhibits the strong absorption characteristics with respect to the specific wavelength due to the multiple interference, the high-definition, high-separation light modulation is capable of being performed.

This embodiment of the light modulation device 1 has the structure, which is sufficiently smaller than the wavelengths of the incident light L1, as the minimum unit of the light modulation. Therefore, the light modulation device 1 exhibits the light modulation characteristics of markedly higher definition and markedly higher separation than the light modulation devices described in, for example, International Patent Publication No. WO2002/082042 and Japanese Unexamined Patent Publication No. 2001-174719. Also, with this embodiment of the light modulation device 1, which comprises the light transmissive fine hole body 20 having the plurality of the regularly arrayed fine holes 21, 21, . . . , the light modulation structure is capable of being kept regular, the intra-plane uniformity of the light modulation characteristics is capable of being kept high, and the reliable light modulation characteristics are capable of being obtained.

With this embodiment, the multiple interference due to the multiple reflected light occurs efficiently, and the high-definition, high-separation light modulation is capable of being performed. The number of times of the reflection within the light transmissive fine hole body 20 may be set at an arbitrary number, such that the interference of the reflected light is capable of occurring. The number of times of the reflection within the light transmissive fine hole body 20 may be comparatively small.

Further, in this embodiment of the light modulation device 1, the mean complex index of refraction of the light transmissive fine hole body 20 is capable of being easily altered with, for example, the technique, wherein the complex index of refraction of the light transmissive substance 22, which is to be filled in the plurality of the fine holes 21, 21, . . . of the light transmissive fine hole body 20, is altered, or the technique, wherein the complex index of refraction of the light transmissive substance 22 having been filled in the fine holes 21, 21, . . . of the light transmissive fine hole body 20 is altered electrically. Therefore, the light modulation characteristics of this embodiment of the light modulation device 1 is capable of being altered in accordance with, for example, the design alterations of an optical system, in which the light modulation device 1 is to be incorporated.

In this embodiment, each of the plurality of the fine holes 21, 21, . . . of the light transmissive fine hole body 20 is the approximately straight hole, which extends from the side of the first reflecting body 10 toward the side of the second reflecting body 30, and which is open at the surface of the light transmissive fine hole body 20 on the side of the first reflecting body 10 and at the surface of the light transmissive fine hole body 20 on the side of the second reflecting body 30. Also, the first reflecting body 10 has the through-holes 11, 11, . . . , which are formed in the pattern identical with the pattern of the fine holes 21, 21, . . . of the light transmissive fine hole body 20. Further, the second reflecting body 30 has the through-holes 31, 31, . . . , which are formed in the pattern identical with the pattern of the fine holes 21, 21, . . . of the light transmissive fine hole body 20. Therefore, the light transmissive substance 22 is capable of being introduced into the fine holes 21, 21, . . . of the light transmissive fine hole body 20 from the side of the first reflecting body 10 and/or the side of the second reflecting body 30 and is capable of being discharged from the fine holes 21, 21, . . . of the light transmissive fine hole body 20 from the side of the first reflecting body 10 and/or the side of the second reflecting body 30. Also, the kind and/or the quantity of the light transmissive substance 22 to be filled in the fine holes 21, 21, . . . of the light transmissive fine hole body 20 is capable of being altered easily. Further, the mean complex index of refraction of the light transmissive fine hole body 20 is capable of being altered easily.

Furthermore, this embodiment of the light modulation device 1 has the structure, in which the light transmissive fine hole body 20 is sandwiched between the first reflecting body 10 and the second reflecting body 30, and the light modulation device 1 is capable of being produced easily by the utilization of the anodic oxidation processing, or the like. Accordingly, the light modulation device 1 has the advantages over the conventional interference filters, such as the etalons, in that the light modulation device 1 is easy to produce and is capable of being formed as a light modulation device having a large area.

Also, this embodiment of the light modulation device 1 has the wavelength selectivity through the structure. Therefore, the light modulation device 1 exhibits little device deterioration (color facing, and the like) and has good long term use stability.

Second Embodiment

Figure 3A:
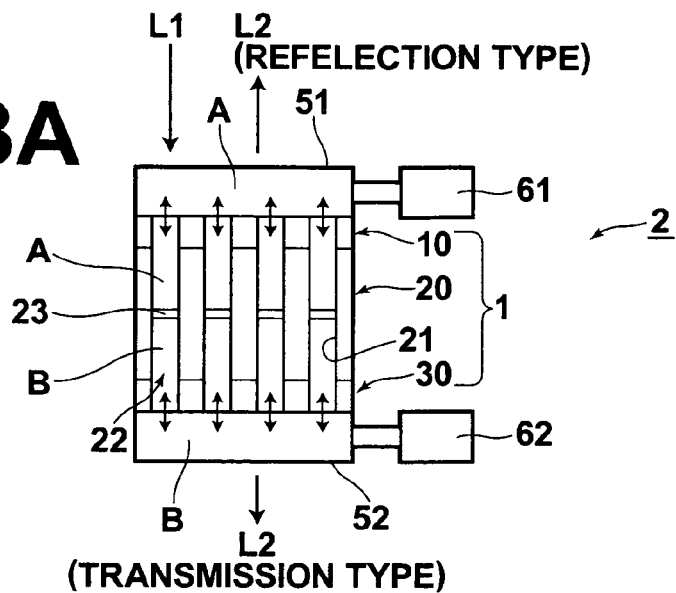
FIG. 3A is a sectional view showing a second embodiment of the light modulation device in accordance with the present invention, the sectional view being taken in a thickness direction of the light modulation device.

A second embodiment of the light modulation device in accordance with the present invention will be described herein below with reference to FIG. 3A. The second embodiment of the light modulation device in accordance with the present invention has a structure basically identical with the structure of the first embodiment described above. In FIG. 3A, similar elements are numbered with the same reference numerals with respect to FIG. 1A. FIG. 3A is a sectional view corresponding to FIG. 1A showing the first embodiment described above.

With reference to FIG. 3A, a light modulation device 2, which is the second embodiment of the light modulation device in accordance with the present invention, comprises the light modulation device 1, which is the first embodiment of the light modulation device in accordance with the present invention. The light modulation device 2 also comprises a light transmissive cell 51 and a light transmissive cell 52, which are bonded to the opposite surfaces of the light modulation device 1. The light transmissive cell 51 and the light transmissive cell 52 have been filled with light transmissive substances having different complex indexes of refraction.

Specifically, the light transmissive cell 51, which has been filled with a light transmissive substance A (a fluidal substance, preferably a liquid), is bonded to the first reflecting body 10 of the light modulation device 1. The surface of the light transmissive cell 51 on the side of the first reflecting body 10 is formed so as to allow the passage of the light transmissive substance A. The light transmissive substance A contained in the light transmissive cell 51 is capable of being introduced into the plurality of the fine holes 21, 21, . . . of the light transmissive fine hole body 20 by the utilization of a pump 61, which is connected to the light transmissive cell 51.

Also, the light transmissive cell 52, which has been filled with a light transmissive substance B (a fluidal substance, preferably a liquid) having a complex index of refraction different from the complex index of refraction of the light transmissive substance A, is bonded to the second reflecting body 30 of the light modulation device 1. The surface of the light transmissive cell 52 on the side of the second reflecting body 30 is formed so as to allow the passage of the light transmissive substance B. The light transmissive substance B contained in the light transmissive cell 52 is capable of being introduced into the plurality of the fine holes 21, 21, . . . of the light transmissive fine hole body 20 by the utilization of a pump 62, which is connected to the light transmissive cell 52.

With this embodiment of the light modulation device 2, either one of the light transmissive substance A and the light transmissive substance B is capable of being selected as the light transmissive substance 22 and filled in the plurality of the fine holes 21, 21, of the light transmissive fine hole body 20. Also, through the adjustment of the force for injecting the light transmissive substance A with the pump 61 and the force for injecting the light transmissive substance B with the pump 62, both the light transmissive substance A and the light transmissive substance B are capable of being filled in an arbitrary ratio in the plurality of the fine holes 21, 21, . . . of the light transmissive fine hole body 20. In such cases, a constitution should preferably be employed, wherein air bubble 23, or the like, is allowed to intervene between the light transmissive substance A and the light transmissive substance B in each of the fine holes 21, 21, . . . of the light transmissive fine hole body 20, such that the light transmissive substance A and the light transmissive substance B may not mix together. FIG. 3A shows the cases wherein identical quantities of the light transmissive substance A and the light transmissive substance B are filled in each of the fine holes 21, 21, . . . of the light transmissive fine hole body 20.

No limitation is imposed upon the kind of the pump 61 and the kind of the pump 62. Examples of the pumps constituting the pump 61 and the pump 62 include an electrohydrodynamic type of pump, an electroendosmotic type of pump, an electrophoretic pump, a thermocapillary pump, an electrowetting pump, and an electrocapillary pump. The pump 61 and the pump 62 may be constituted of different kinds of pumps.

In this embodiment of the light modulation device 2, the complex index of refraction of the light transmissive substance 22, which is filled in the fine holes 21, 21, . . . of the light transmissive fine hole body 20, is capable of being set at the complex index of refraction of the light transmissive substance A, the complex index of refraction of the light transmissive substance B, or an arbitrary complex index of refraction, which falls within the range of the complex index of refraction of the light transmissive substance A to the complex index of refraction of the light transmissive substance B. Since the complex index of refraction of the light transmissive substance 22, which is filled in the fine holes 21, 21, . . . of the light transmissive fine hole body 20, is thus capable of being altered easily, the light modulation characteristics of the light modulation device 2 are capable of being altered easily. Also, with automatic control of the pump 61 and the pump 62, the mean complex index of refraction $n_2$ of the light transmissive fine hole body 20 is capable of being altered automatically.

This embodiment of the light modulation device 2 comprises the light modulation device 1, which is the first embodiment of the light modulation device in accordance with the present invention, as the basic constitution and is constituted such that the complex index of refraction of the light transmissive substance 22, which is filled in the fine holes 21, 21, . . . of the light transmissive fine hole body 20, is capable of being altered easily. Therefore, with the light modulation device 2, the high-definition, high-separation light modulation is capable of being performed, and the light modulation characteristics are capable of being altered easily.

Examples of Design Modifications of the Second Embodiment

The second embodiment of the light modulation device in accordance with the present invention may be modified such that a plurality of kinds of light transmissive substances are capable of being filled successively or simultaneously in at least either one of the light transmissive cell 51 and the light transmissive cell 52. In such cases, the flexibility of the selection of the mean complex index of refraction $n_2$ of the light transmissive fine hole body 20 is capable of being enhanced, and the flexibility of the selection of the light modulation characteristics is capable of being kept high. Also, either one of the light transmissive cell 51 and the light transmissive cell 52 maybe utilized as an empty cell for the discharging of the light transmissive substance 22 from the fine holes 21, 21, of the light transmissive fine hole body 20.

Figure 3B:
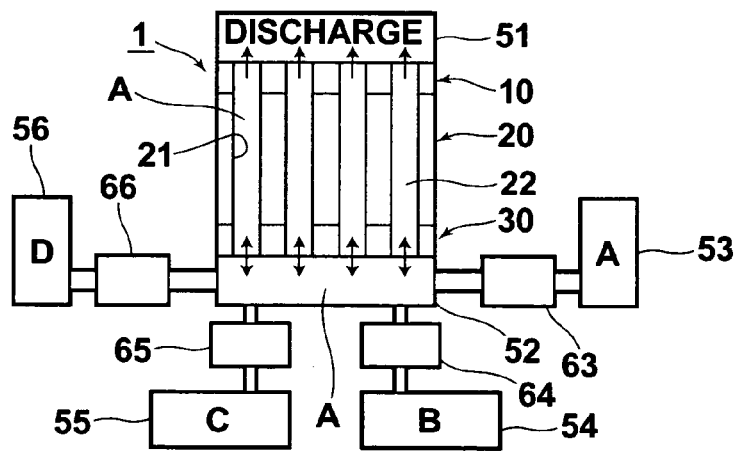
FIGS. 3B and 3C are sectional views showing examples of design modifications of the second embodiment of the light modulation device in accordance with the present invention.

For example, as illustrated in FIG. 3B, the light transmissive cell 51 may be utilized as the empty cell for the discharging of the light transmissive substance 22 from the fine holes 21, 21, . . . of the light transmissive fine hole body 20. Also, the light transmissive cell 52 may be connected to storage tanks 53, 54, 55, and 56 via pumps 63, 64, 65, and 66, respectively. The storage tanks 53, 54, 55, and 56 respectively store a plurality of kinds of light transmissive substances A, B, C, and D (fluidal substances, preferably liquids) having different complex indexes of refraction. With the constitution illustrated in FIG. 3B, one of the light transmissive substances A, B, C, and D is capable of being filled in the light transmissive cell 52 and introduced as the light transmissive substance 22 into the fine holes 21, 21, . . . of the light transmissive fine hole body 20. It is also possible to mix at least two light transmissive substances among the light transmissive substances A, B, C, and D in an arbitrary ratio and to introduce the resulting mixture into the fine holes 21, 21, . . . of the light transmissive fine hole body 20.

With the constitution illustrated in FIG. 3B, in cases where the light transmissive substance 22 to be filled in the fine holes 21, 21, . . . of the light transmissive fine hole body 20 is to be exchanged, the light transmissive substance 22, which has been filled in the fine holes 21, 21, . . . most recently, is capable of being pushed out and discharged into the light transmissive cell 51, which is now empty, and thereafter a new light transmissive substance 22 is capable of being injected into the fine holes 21, 21, . . . The number of the storage tanks, which are connected to the light transmissive cell 52, is not limited to four and may be set at an arbitrarily number.

Figure 3C:
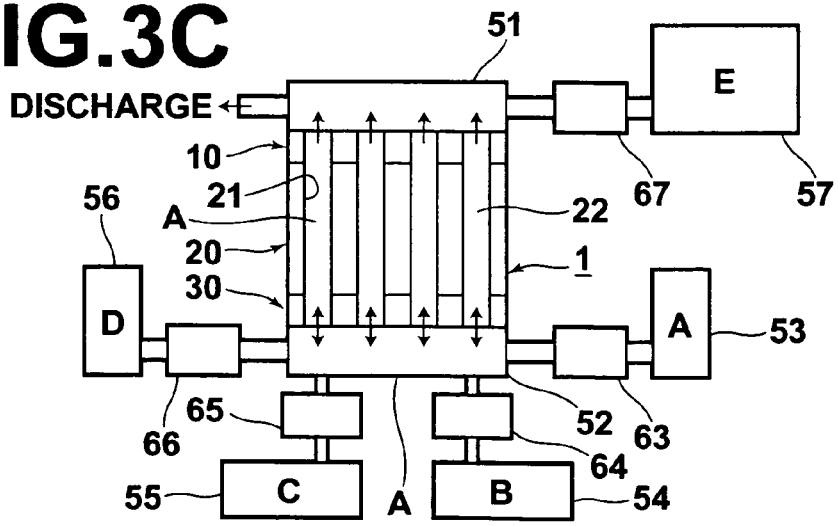

Alternatively, as illustrated in FIG. 3C, a washing tank 57 for storing a washing liquid E may be connected to the light transmissive cell 51 via a pump 67. With the constitution illustrated in FIG. 3C, in cases where the light transmissive substance 22 to be filled in the fine holes 21, 21, . . . of the light transmissive fine hole body 20 is to be exchanged, the light transmissive substance 22, which has been filled in the fine holes 21, 21, . . . most recently, is capable of being pushed out and discharged into the light transmissive cell 51, which is now empty, and thereafter the washing liquid E is capable of being injected into the fine holes 21, 21, . . . The fine holes 21, 21, . . . of the light transmissive fine hole body 20 is thus capable of being washed with the washing liquid E. The constitution illustrated in FIG. 3C is advantageous in that contamination of the light transmissive substance 22, which has been filled in the fine holes 21, 21, . . . most recently, is capable of being suppressed.

Third Embodiment

Figure 4:
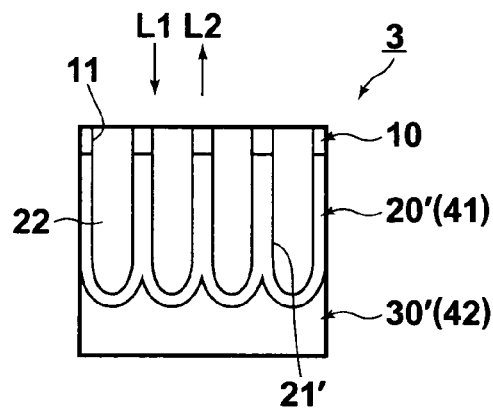
FIG. 4 is a sectional view showing a third embodiment of the light modulation device in accordance with the present invention, the sectional view being taken in a thickness direction of the light modulation device.

A third embodiment of the light modulation device in accordance with the present invention will be described herein below with reference to FIG. 4. The third embodiment of the light modulation device in accordance with the present invention has a structure basically identical with the structure of the first embodiment described above. In FIG. 4, similar elements are numbered with the same reference numerals with respect to FIG. 1A. FIG. 4 is a sectional view corresponding to FIG. 1A showing the first embodiment described above.

With reference to FIG. 4, a light modulation device 3, which is the third embodiment of the light modulation device in accordance with the present invention, comprises the first reflecting body 10 as in the first embodiment described above. The light modulation device 3 also comprises a light transmissive fine hole body 20'. The light modulation device 3 further comprises a second reflecting body 30'. The first reflecting body 10, the light transmissive fine hole body 20', and the second reflecting body 30' are located in this order from the light incidence side (i.e., the top side in FIG. 4). The light modulation device 3 thus has the structure basically identical with the structure of the first embodiment described above, except that each of fine holes 21', 21', ... of the light transmissive fine hole body 20' is not the through-hole, and the second reflecting body 30' has the perfect reflective characteristics. Each of the fine holes 21', 21', ... of the light transmissive fine hole body 20' is open only at the surface of the light transmissive fine hole body 20' on the side of the first reflecting body 10. Each of the fine holes 21', 21', ... of the light transmissive fine hole body 20' is closed at the surface of the light transmissive fine hole body 20' on the side of the second reflecting body 30'.

The light transmissive fine hole body 20' is constituted of the metal oxide body ($Al_2O_3$) 41 illustrated in FIG. 2B, which is obtained from the anodic oxidation processing performed on the part of the metal body 40 to be subjected to the anodic oxidation processing. The second reflecting body 30' is constituted of the un-anodized part (Al) 42 of the metal body 40 to be subjected to the anodic oxidation processing, the un-anodized part 42 being illustrated in FIG. 2B. The first reflecting body 10 is constituted of the metal layer of gold, or the like, which has been formed on the light transmissive fine hole body 20'.

As in the cases of the first embodiment described above, this embodiment of the light modulation device 3 has the multiple interference structure and is capable of performing the high-definition, high-separation light modulation.

Also, as in the cases of the first embodiment described above, with this embodiment of the light modulation device 3, which comprises the light transmissive fine hole body 20' having the plurality of the regularly arrayed fine holes 21', 21', ..., the light modulation structure is capable of being kept regular, the intra-plane uniformity of the light modulation characteristics is capable of being kept high, and the reliable light modulation characteristics are capable of being obtained.

Also, with this embodiment of the light modulation device 3, in which the second reflecting body 30' is the perfect reflective body, only the reflection type of device, in which the modulated light L2 is radiated out from the first reflecting body 10, is obtained.

Further, in this embodiment of the light modulation device 3, as in the cases of the first embodiment described above, the mean complex index of refraction of the light transmissive fine hole body 20' is capable of being easily altered with, for example, the technique, wherein the complex index of refraction of the light transmissive substance 22, which is to be filled in the plurality of the fine holes 21', 21', ... of the light transmissive fine hole body 20', is altered. Therefore, the light modulation characteristics of this embodiment of the light modulation device 3 is capable of being altered in accordance with, for example, the design alterations of an optical system, in which the light modulation device 3 is to be incorporated.

In this embodiment, each of the plurality of the fine holes 21', 21', ... of the light transmissive fine hole body 20' is the approximately straight hole, which is open only at the surface of the light transmissive fine hole body 20' on the side of the first reflecting body 10. Also, the first reflecting body 10 has the through-holes 11, 11, ..., which are formed in the pattern identical with the pattern of the fine holes 21', 21', ... of the light transmissive fine hole body 20'. Therefore, the kind and/or the quantity of the light transmissive substance 22, which is to be introduced into the fine holes 21', 21', ... of the light transmissive fine hole body 20' from the side of the first reflecting body 10, is capable of being altered easily. Further, the mean complex index of refraction of the light transmissive fine hole body 20' is capable of being altered easily.

In this embodiment of the light modulation device 3, in cases where the light transmissive substance 22 is a liquid crystal, or the like, the mean complex index of refraction of the light transmissive fine hole body 20' is capable of being altered with the technique, wherein the complex index of refraction of the light transmissive substance 22 having been filled in the fine holes 21', 21', ... of the light transmissive fine hole body 20' is altered electrically.

Furthermore, as in the cases of the first embodiment described above, this embodiment of the light modulation device 3 has the structure, in which the light transmissive fine hole body 20' is sandwiched between the first reflecting body 10 and the second reflecting body 30', and the light modulation device 3 is capable of being produced easily by the utilization of the anodic oxidation processing, or the like. Accordingly, the light modulation device 3 has the advantages over the conventional interference filters, such as the etalons, in that the light modulation device 3 is easy to produce and is capable of being formed as a light modulation device having a large area.

Also, as in the cases of the first embodiment described above, this embodiment of the light modulation device 3 has the wavelength selectivity through the structure. Therefore, the light modulation device 3 exhibits little device deterioration (color facing, and the like) and has good long term use stability.

(Design Modifications)

The light modulation device in accordance with the present invention is not limited to the embodiments described above and may be embodied in various other ways.

In the first, second, and third embodiments described above, Al alone is mentioned as the principal constituent of the metal body 40 to be subjected to the anodic oxidation processing, which metal body 40 is to be employed for the formation of the light transmissive fine hole body 20 or the light transmissive fine hole body 20'. However, the metal body 40 to be subjected to the anodic oxidation processing may be constituted of an arbitrary metal, which is capable of being subjected to the anodic oxidation processing and is capable of yielding the metal oxide, which has the light transmissivity. Besides Al, examples of the metals, which are capable of being employed as the principal constituents of the metal body 40 to be subjected to the anodic oxidation processing, include Ti, Ta, Hf, Zr, Si, In, and Zn. The metal body 40 to be subjected to the anodic oxidation processing may contain at least two kinds of metals, which are capable of being subjected to the anodic oxidation processing.

In cases where the anodic oxidation processing is utilized, the light transmissive fine hole body 20, which has the plurality of the fine holes 21, 21, ... Arrayed regularly, or the light transmissive fine hole body 20', which has the plurality of the fine holes 21', 21', ... arrayed regularly, is capable of being produced easily. Also, the light modulation device having a large area is capable of being produced easily. Further, the light transmissive fine hole body 20 or the light transmissive fine hole body 20' having good structure regularity is capable of being produced easily. Therefore, the light modulation device in accordance with the present invention, which exhibits the high intra-plane uniformity of the light modulation characteristics and has the reliable light modulation characteristics, is capable of being produced easily.

As described above, the light modulation device in accordance with the present invention should preferably be produced by the utilization of the anodic oxidation processing. However, it is also possible for the light modulation device in accordance with the present invention to be produced with fine hole forming techniques other than the anodic oxidation processing. For example, the light modulation device in accordance with the present invention may be produced with a fine hole forming technique, wherein fine holes (which may be through-holes or holes (recesses) other than the through-holes) are drawn in an arbitrary pattern on a light transmissive base body by use of an electron drawing technique, such as a focused ion beam (FIB) technique or an electron beam (EB) technique. Alternatively, the light modulation device in accordance with the present invention may be produced with a fine hole forming technique, wherein a light transmissive fine hole body having an arbitrary recess-protrusion pattern is formed on a surface of a perfect reflective base body or a semi-transmissive semi-reflective base body by use of a lithographic technique (in this case, the recesses act as the fine holes). In cases where one of the fine hole forming techniques other than the anodic oxidation processing is utilized, the flexibility of the design with respect to the material of the light transmissive fine hole body 20 or the light transmissive fine hole body 20', the hole pattern of the fine holes 21, 21, ... or the fine holes 21', 21', ... , and the like, is capable of being enhanced.

The material of each of the first reflecting body 10, the second reflecting body 30, and the second reflecting body 30' is not limited to the metal and may be selected from various other materials having the reflective characteristics.

No limitation is imposed upon the shape of each of the fine holes 21, 21, ... of the light transmissive fine hole body 20 and the fine holes 21', 21', ... of the light transmissive fine hole body 20'. In the embodiments described above, each of the fine holes 21, 21, ... of the light transmissive fine hole body 20 and the fine holes 21', 21', ... of the light transmissive fine hole body 20' is formed as the approximately straight hole having the circular cylinder-like shape. Alternatively, each of the fine holes 21, 21, ... and the fine holes 21', 21', ... may have a prismatic shape, such as a triangular prism-like shape or a quadrangular prism-like shape. However, the shape of each of the fine holes 21, 21, . . . and the fine holes 21', 21', ... is not limited to the cylindrical or prismatic shape. As another alternative, the fine holes 21, 21, ... or the fine holes 21', 21', ... may have random shapes.

Also, no limitation is imposed upon the array pattern of the fine holes 21, 21, ... or the fine holes 21', 21', ... For example, the plurality of the fine holes 21, 21, ... or the plurality of the fine holes 21', 21', ... maybe arrayed in a one-dimensional direction parallel with the light incidence surface of the first reflecting body 10. Alternatively, the plurality of the fine holes 21, 21, ... or the plurality of the fine holes 21', 21', ... may be arrayed in two-dimensional directions parallel with the light incidence surface of the first reflecting body 10. In the embodiments described above, the plurality of the fine holes 21, 21, ... or the plurality of the fine holes 21', 21', ... are arrayed in the two-dimensional directions parallel with the light incidence surface of the first reflecting body 10. As another alternative, the plurality of the fine holes 21, 21, ... or the plurality of the fine holes 21', 21', ... may be arrayed in the two-dimensional directions parallel with the light incidence surface of the first reflecting body 10, and the array of the fine holes in the two-dimensional directions may be iterated with respect to the depth direction of the light transmissive fine hole body. The light transmissive fine hole body may thus have the three-dimensional fine hole array structure. As a further alternative, the array of the plurality of the fine holes 21, 21, ... or the plurality of the fine holes 21', 21', ... may be a random array.

EXAMPLE

The present invention will further be illustrated by the following non-limitative example.

EXAMPLE

<Production of Light Modulation Device>

The aforesaid third embodiment of the light modulation device in accordance with the present invention as illustrated in FIG. 4 was produced in the manner described below. Specifically, the anodic oxidation processing was performed on a part of the metal body 40 to be subjected to the anodic oxidation processing (as illustrated in FIG. 2A), which metal body 40 contained Al as the principal constituent. With the anodic oxidation processing, the light transmissive fine hole body ($Al_2O_3$) 20' (as illustrated in FIG. 4) having a thickness d of 250 nm was formed. An opening rate of the fine holes 21', 21', ... of the light transmissive fine hole body 20' (opening rate=total opening area of the fine holes 21', 21', ... /entire area of the light transmissive fine hole body 20') was equal to ½. A nano-structure body (as illustrated in FIG. 2B) comprising the light transmissive fine hole body 20' and the second reflecting body 30', which was constituted of the un-anodized part (Al), was thus obtained. Thereafter, the first reflecting body 10 was formed on the surface of the nano-structure body by use of a gold vacuum evaporation technique. In this manner, the reflection type of the light modulation device 3 as illustrated in FIG. 4 was produced.

The complex indexes of refraction of substances vary for different wavelengths of the incident light. For reference, the complex indexes of refraction of Au, $Al_2O_3$, and Al with respect to the incident light having a wavelength of 600 nm are shown below. The mean complex index of refraction of the first reflecting body 10, the mean complex index of refraction of the light transmissive fine hole body 20' in the empty state in which the light transmissive substance 22 has not been filled in the fine holes 21', 21', ... (i.e., in the state in which air (refractive index n=1) is contained within the fine holes 21', 21', ... : a condition 1 described later), and the mean complex index of refraction of the second reflecting body 30' are also shown below. The mean complex index of refraction of the first reflecting body 10 has been calculated with the opening rate of the fine holes 21', 21', ... being taken into consideration. Since the second reflecting body 30' does not have holes, the mean complex index of refraction of the second reflecting body 30' is equal to the complex index of refraction of Al.

Complex index of refraction of Au: 0.175-i3.10
Complex index of refraction of $Al_2O_3$: 1.767
Complex index of refraction of Al: 0.97-i6.00
Mean complex index of refraction $n_1$-$ik_1$ of the first reflecting body 10: 0.725-i3.10
Mean complex index of refraction $n_2$ of the light transmissive fine hole body 20' (in the empty state): 1.256
Mean complex index of refraction $n_3$-$ik_3$ of the second reflecting body 30': 0.97-i6.00

<Evaluation>

With respect to the light transmissive fine hole body 20' in the empty state in which the light transmissive substance 22 has not been filled in the fine holes 21', 21', ... (i.e., in the state in which air (refractive index n=1) is contained within the fine holes 21', 21', . . . : the condition 1), white light (produced by a xenon light source) was irradiated, and a reflected light spectrum was measured by use of Polychromator M25 (supplied by Bunko Keiki K.K.). The reflection intensity was normalized with a reflected light spectrum having been acquired with respect to alumina.

Also, each of two kinds of the light transmissive substances 22, 22 was filled in the fine holes 21', 21', . . . of the light transmissive fine hole body 20', and the evaluation was made in the same manner as that described above. As one of the two kinds of the light transmissive substances 22, 22, water (refractive index n=1.33: a condition 2) was employed. Also, as the other kind of the light transmissive substance 22, ethanol (purity 100%, refractive index n=1.36: a condition 3) was employed.

The mean complex index of refraction $n_2$ of the light transmissive fine hole body 20' under each of the condition 1, the condition 2, and the condition 3 was as follows:

Condition 1: 1.256

Condition 2: 1.476

Condition 3: 1.496

<Results>

Figure 5:
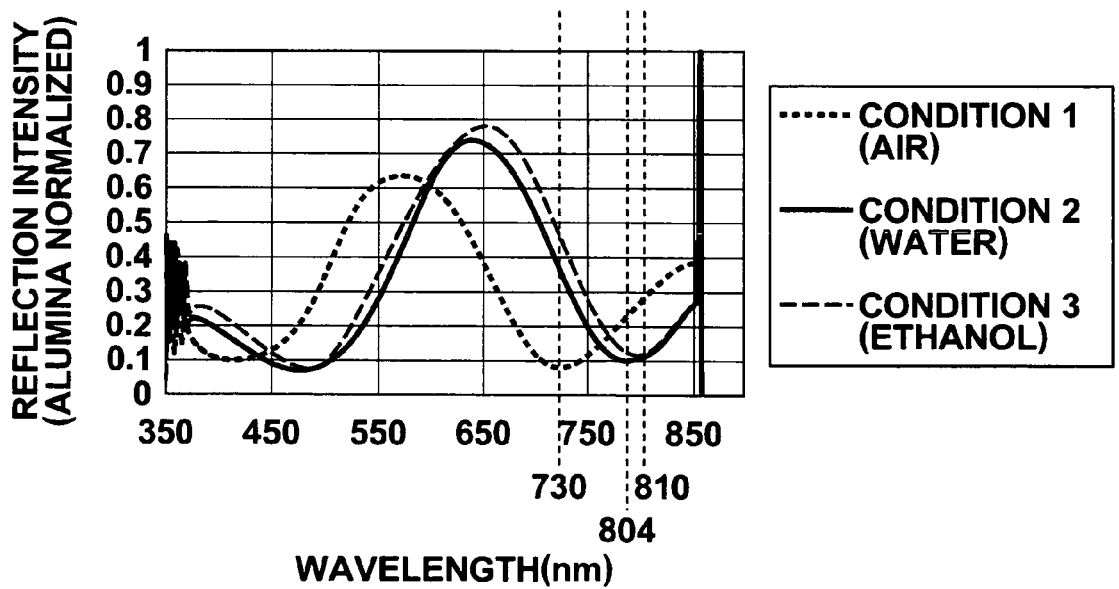
FIG. 5 is a graph showing results of evaluation of the third embodiment of the light modulation device in accordance with the present invention.

The reflected light spectrums as shown in FIG. 5 were obtained. As illustrated in FIG. 5, with respect to the light transmissive fine hole body 20' in the empty state in which the light transmissive substance 22 has not been filled in the fine holes 21', 21', . . . (i.e., in the state in which air is contained within the fine holes 21', 21', . . . : the condition 1), with respect to the light transmissive fine hole body 20' in the filled state in which water has been filled in the fine holes 21', 21', . . . (the condition 2), and with respect to the light transmissive fine hole body 20' in the filled state in which ethanol has been filled in the fine holes 21', 21', . . . (the condition 3), the absorption due to the multiple interference occurred, and the reflected light spectrums, in which the absorption peak wavelengths varied for different conditions, were obtained. The absorption peak wavelength $\lambda$ under each of the different conditions were as follows:

Condition 1: 730 nm

Condition 2: 804 nm

Condition 3: 810 nm

It was confirmed with visual inspection that the reflected light beams having different colors due to the difference in absorption peak wavelength $\lambda$ were radiated out under the condition 1 and the condition 2. Also, it was confirmed with visual inspection that the reflected light beams having different colors due to the difference in absorption peak wavelength $\lambda$ were radiated out under the condition 1 and the condition 3.

From the results of the evaluation described above, it was confirmed that the light modulation device in accordance with the present invention exhibited the absorption characteristics with respect to the light having the specific wavelength. (The reflected light spectrums obtained in the Example described above were the modulated light spectrums obtained when the white light was irradiated as the incident light.) Also, it was confirmed that, in cases where the kind of the light transmissive substance 22 to be filled in the fine holes 21', 21', . . . of the light transmissive fine hole body 20' is altered, the mean complex index of refraction of the light transmissive fine hole body 20' was capable of being altered easily, and the light modulation characteristics were capable of being altered easily.

INDUSTRIAL APPLICABILITY

The light modulation device in accordance with the present invention is capable of being utilized as an interference filter, a display device, and the like.

What is claimed is:

1. A light modulation device, comprising:

i) a first reflecting body, which has semi-transmissive semi-reflective characteristics, ii) a light transmissive fine hole body having a plurality of fine holes, which are adapted to be filled with a light transmissive substance and have diameters sufficiently smaller than wavelengths of incident light, and iii) a second reflecting body, which has perfect reflective characteristics or semi-transmissive semi-reflective characteristics, the first reflecting body, the light transmissive fine hole body, and the second reflecting body being located in this order from a light incidence side, the light modulation device exhibiting absorption characteristics for absorbing light having a specific wavelength in accordance with a mean complex index of refraction of the first reflecting body, the mean complex index of refraction of the second reflecting body, and the mean complex index of refraction and a thickness of the light transmissive fine hole body, whereby the incident light is modulated due to the absorption characteristics, and modulated light is radiated out from the first reflecting body and/or the second reflecting body.

2. A light modulation device as defined in claim 1 wherein the mean complex index of refraction of the light transmissive fine hole body is alterable, and the wavelength of the absorbed light is alterable in accordance with the mean complex index of refraction of the light transmissive fine hole body.

3. A light modulation device as defined in claim 2 wherein the complex index of refraction of the light transmissive substance filled in the plurality of the fine holes of the light transmissive fine hole body is alterable, and the mean complex index of refraction of the light transmissive fine hole body is alterable through the alteration of the complex index of refraction of the light transmissive substance.

4. A light modulation device as defined in claim 3 wherein the kind and/or the quantity of the light transmissive substance filled in the plurality of the fine holes of the light transmissive fine hole body is alterable, and the mean complex index of refraction of the light transmissive fine hole body is alterable through the alteration of the kind and/or the quantity of the light transmissive substance filled in the plurality of the fine holes of the light transmissive fine hole body.

5. A light modulation device as defined in claim 4 wherein the plurality of the fine holes of the light transmissive fine hole body are open at a surface of the light transmissive fine hole body on the side of the first reflecting body, the first reflecting body has a plurality of through-holes, each of which communicates with one of the plurality of the fine holes of the light transmissive fine hole body, and the light transmissive substance is capable of being introduced into each of the plurality of the fine holes of the light transmissive fine hole body through each of the plurality of the through-holes of the first reflecting body and is capable of being discharged from each of the plurality of the fine holes of the light transmissive fine hole body through each of the plurality of the through-holes of the first reflecting body.

6. A light modulation device as defined in claim 4 wherein the plurality of the fine holes of the light transmissive fine hole body are open at a surface of the light transmissive fine hole body on the side of the second reflecting body, the second reflecting body has a plurality of through-holes, each of which communicates with one of the plurality of the fine holes of the light transmissive fine hole body, and the light transmissive substance is capable of being introduced into each of the plurality of the fine holes of the light transmissive fine hole body through each of the plurality of the through-holes of the second reflecting body and is capable of being discharged from each of the plurality of the fine holes of the light transmissive fine hole body through each of the plurality of the through-holes of the second reflecting body.

7. A light modulation device as defined in claim 5 wherein the plurality of the fine holes of the light transmissive fine hole body are approximately straight holes extending from the side of the first reflecting body toward the side of the second reflecting body.

8. A light modulation device as defined in claim 6 wherein the plurality of the fine holes of the light transmissive fine hole body are approximately straight holes extending from the side of the first reflecting body toward the side of the second reflecting body.

9. A light modulation device as defined in claim 5 wherein the light transmissive fine hole body is constituted of a metal oxide body, which is obtained from anodic oxidation processing performed on a part of a metal body to be subjected to the anodic oxidation processing, the second reflecting body is constituted of an un-anodized part of the metal body to be subjected to the anodic oxidation processing, and the first reflecting body is constituted of a metal layer, which has been formed on the light transmissive fine hole body.

10. A light modulation device as defined in claim 5 wherein the light transmissive fine hole body is constituted of a metal oxide body, which is obtained from anodic oxidation processing performed on an entire region of a metal body to be subjected to the anodic oxidation processing, or a metal oxide body, which is obtained from a processing, wherein the anodic oxidation processing is performed on a part of the metal body to be subjected to the anodic oxidation processing, and wherein an un-anodized part of the metal body to be subjected to the anodic oxidation processing is removed from the metal body to be subjected to the anodic oxidation processing, and each of the first reflecting body and the second reflecting body is constituted of a metal layer, which has been formed on the light transmissive fine hole body.

11. A light modulation device as defined in claim 6 wherein the light transmissive fine hole body is constituted of a metal oxide body, which is obtained from anodic oxidation processing performed on an entire region of a metal body to be subjected to the anodic oxidation processing, or a metal oxide body, which is obtained from a processing, wherein the anodic oxidation processing is performed on a part of the metal body to be subjected to the anodic oxidation processing, and wherein an un-anodized part of the metal body to be subjected to the anodic oxidation processing is removed from the metal body to be subjected to the anodic oxidation processing, and each of the first reflecting body and the second reflecting body is constituted of a metal layer, which has been formed on the light transmissive fine hole body.

* * * * *